(12) United States Patent
Kurita et al.

(10) Patent No.: US 6,859,164 B2
(45) Date of Patent: Feb. 22, 2005

(54) DETECTING SYSTEM

(75) Inventors: Naoyuki Kurita, Kokubunji (JP); Hiroshi Kondoh, Fuchu (JP); Mikito Tsubota, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/220,069

(22) PCT Filed: Mar. 1, 2002

(86) PCT No.: PCT/JP02/01918

§ 371 (c)(1),
(2), (4) Date: Aug. 28, 2002

(87) PCT Pub. No.: WO03/075035

PCT Pub. Date: Sep. 12, 2003

(65) Prior Publication Data

US 2003/0164790 A1 Sep. 4, 2003

(51) Int. Cl.$^7$ .................. G01S 13/56; G01S 13/536; G01S 7/40
(52) U.S. Cl. .................. 342/28; 342/27; 342/59; 342/104; 342/127; 342/128; 342/133; 342/146; 342/147; 342/165; 342/173; 342/174; 342/195
(58) Field of Search .................. 342/104, 107, 342/118, 127–133, 146, 147, 20, 27, 28, 52–59, 165–175, 195

(56) References Cited

U.S. PATENT DOCUMENTS

| | | | | |
|---|---|---|---|---|
| 3,289,202 A | * | 11/1966 | Preti | 342/27 |
| 3,300,768 A | * | 1/1967 | Bystrom et al. | 342/27 |
| 3,314,066 A | * | 4/1967 | Schwartz et al. | 342/27 |
| 3,815,131 A | * | 6/1974 | Dautel et al. | 342/28 |
| 3,877,002 A | * | 4/1975 | Cheal et al. | 342/27 |
| 3,932,871 A | * | 1/1976 | Foote | 342/28 |
| 4,091,367 A | * | 5/1978 | Harman | 342/27 |
| 4,132,988 A | * | 1/1979 | Blacksmith et al. | 342/27 |
| 6,400,307 B2 | * | 6/2002 | Fullerton et al. | 342/28 |
| 6,466,157 B1 | * | 10/2002 | Bjornholt et al. | 342/28 |
| 6,518,915 B2 | * | 2/2003 | Schutz et al. | 342/28 |

FOREIGN PATENT DOCUMENTS

| | | | | |
|---|---|---|---|---|
| JP | 8-293089 | 11/1996 | ........... | G08B/31/00 |
| JP | 9-5432 | 1/1997 | ........... | G01S/13/86 |
| JP | 9-138280 | 5/1997 | ........... | G01S/17/02 |
| JP | 11-237466 | 8/1999 | ............. | G01S/7/40 |
| JP | 2001-124846 | 5/2001 | ............. | G01S/7/40 |
| JP | 2001-141804 | 5/2001 | ............. | G01S/7/40 |
| JP | 2001-235367 | 8/2001 | ............. | G01J/1/42 |

* cited by examiner

*Primary Examiner*—Bernarr E. Gregory
(74) *Attorney, Agent, or Firm*—Antonelli, Terry, Stout & Kraus, LLP

(57) ABSTRACT

In a position detecting system used to monitor a suspicious person and to give an alarm by using a radar which transmits/receives a microwave or a millimeterwave, the shape of a detectable area of the radar and that of the area to be monitored are not always equal to each other, and thus, an alarm may be erroneously given in response to the object outside the area to be monitored. For its solution, the area to be monitored is surrounded by a plurality of reflectors, and the coordinate values of the reflectors and the detecting object are calculated based on the signals reflected from the reflectors and the detecting object and then compared. When the coordinate value of the detecting object is inside the area to be monitored, it is determined that the detecting object is an intruding person or the like and an alarm is given. When the coordinate value of the detecting object is outside the area to be monitored, it is determined that the detecting object is not an intruding person or the like and no alarm is given. In addition, if the calibration and self diagnosis of the radar are periodically performed by using at least one of the reflectors, it is possible to maintain the performance of the radar in an optimal state.

26 Claims, 7 Drawing Sheets

DETECTING SYSTEM

TECHNICAL FIELD

The present invention relates to a detecting system using a microwave radar or a millimeterwave radar, and also relates to a detecting system having a detecting area setting means and a calibration means of a radar. The detecting system is suitably used for a security monitoring system.

BACKGROUND ART

As a means for detecting a suspicious person intruding into indoor and/or outdoor sites and for giving an alarm, a detecting system using an infrared sensor such as that disclosed in Japanese Patent Laid-Open No. 2001-235367 has been widely used. In the use of the infrared sensor, a light emitting part and a light receiving part are installed at an entrance gate or an opening through which an suspicious person may intrude, and an abnormality can be detected by the light receiving part based on the detection/nondetection of the infrared light sent from the light emitting part, and then, an alarm signal is transmitted.

However, in the detecting system using the infrared sensor, since the alarm signal is transmitted when the light flux of the infrared light is blocked, even in the case where a leaf or the like crosses over the light flux of the infrared light, the detecting system determines that an intruder crosses over it, and resulting in the error detection in many cases. Also, in the case where the detecting system using the infrared sensor is used in the outdoor environment, since the infrared light does not propagate under bad weather conditions such as fog and snow, the detecting system cannot be used in such a condition.

As a method for solving the above-mentioned problems, a detecting system using a radar using a radio wave with microwave bandwidth or millimeterwave bandwidth instead of the infrared sensor has been developed. In the detecting system using an infrared sensor, it is necessary to provide two devices such as a light emitting part and a light receiving part separately. However, in the case of using a radar as a means for detecting an intruder, the detection and monitoring of the intruder can be performed in the state where a transmitting antenna and a receiving antenna are set in a common case box. Therefore, the detecting system using a radar has a high flexibility in installation of the system in comparison to the detecting system using an infrared sensor.

In addition, in the detecting system using an infrared sensor, the simple information whether or not there exists an intruder is all that can be obtained. Meanwhile, in the detecting system using a radar, since it is possible to obtain the surface information of an intruding object, the possibility of the error detection can be extremely reduced. Therefore, the detecting system using a radar can achieve improved performance in comparison to the detecting system using an infrared sensor.

Furthermore, in the detecting system using a radar, the propagation property of the radio wave is little influenced even under bad weather conditions such as fog and snow. Therefore, the detecting system using a radar has improved reliability in comparison to the detecting system using an infrared sensor.

As described above, the detecting system using a radar has various advantages in comparison to the detecting system using an infrared sensor.

However, the size and shape of the area to be monitored are changed depending on the case. In this respect, since only the one-dimensional information whether the infrared light from the light emitting part can be detected at the light receiving part or not can be obtained in the case of the infrared sensor, the installation of the light emitting part and the light receiving part itself determines the area to be monitored. On the other hand, in the case of a radar, a detectable area of the radar is a fan-shaped area principally determined by the maximum detecting distance and the maximum detecting angle which depend on the performance of a transmitting antenna of the radar. Thus, in such a case where the detectable area of the radar is larger than the area to be monitored, the detecting system may detect a person or the like passing outside the monitoring area and give an alarm therefor.

DISCLOSURE OF THE INVENTION

A typical aspect of the present invention is a detecting system which is provided with a radar for detecting a detecting object; a notification device for notifying the detection of the detecting object; a signal processing unit for controlling the notification device based on the signal sent from the radar; and a detecting area setting device for setting a range of the detecting area.

Another typical aspect of the present invention is a detecting system which is provided with a millimeterwave radar or microwave radar for detecting a monitoring object; an alarm device for notifying the detection of the monitoring object; a signal processing unit for processing a signal received by the radar and sending an operating signal to the alarm device; and a monitoring area setting device for setting a monitoring area of the monitoring object, wherein the signal processing unit controls the alarm device so as to give an alarm when the monitoring object exists inside the monitoring area and so as not to give an alarm when the monitoring object is outside the monitoring area.

BEST MODE FOR CARRYING OUT THE INVENTION

For further understanding of the present invention, the present invention will be described with reference to the accompanying drawings.

Figure 1:
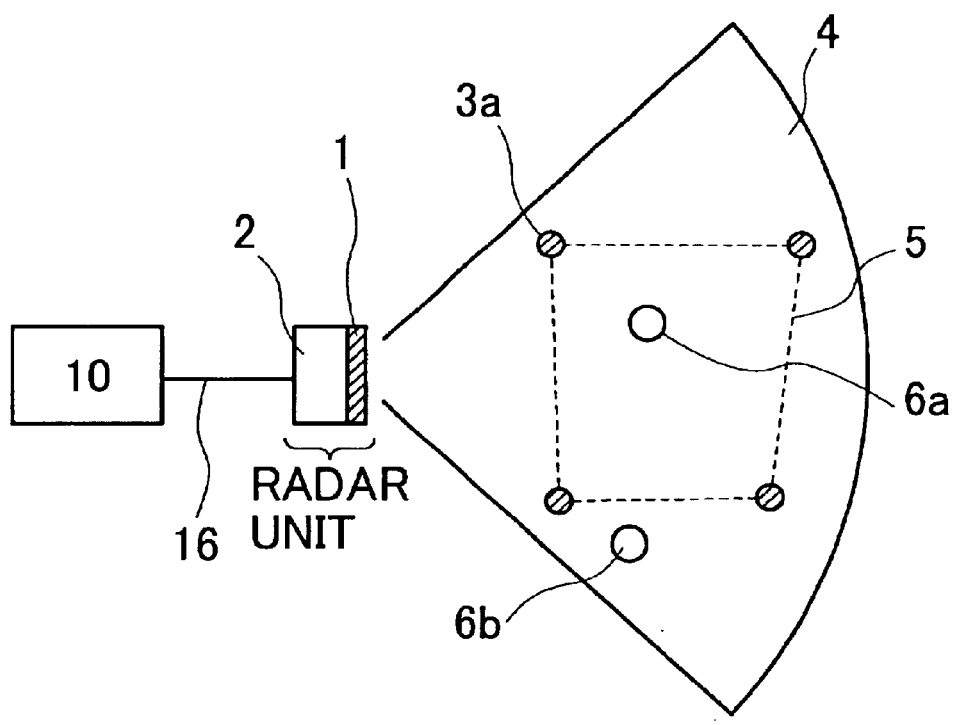
FIG. 1 is a diagram showing a preferred embodiment of the present invention.

FIG. 1 shows a preferred embodiment of the present invention. A radar unit in which a radar module 1 and a signal processing unit 2 are combined is installed near the area to be monitored. In this case, the radar module 1 has a transmitting antenna for a transmitting microwave signal or a millimeterwave signal, a receiving antenna for a receiving microwave signal or a millimeterwave signal, and a radio frequency circuit mounted therein, and the signal processing unit 2 functions to detect a detecting object such as a suspicious object and to transmit an alarm activating signal. When the radar unit transmits the alarm activating signal, the alarm activating signal reaches an alarm means 10 via a cable 16. The alarm means 10 gives an alarm according to the signal.

Note that the alarm means 10 can be set in a place where the radar unit is installed, or can be set in a managing center or the like in a remote place.

In this embodiment, the radar module 1 has a function as a radar. A detectable area 4 of a suspicious object is in the shape of a fan which is principally determined by the maximum detecting distance and the maximum detecting angle based on the performance of the transmitting antenna provided in the radar module 1. In an actual case, however, the size and shape of the area are varied in which the intrusion of the suspicious object is to be monitored. Therefore, the detectable area of the radar unit and the area to be monitored do not always correspond to each other. Thus, in the present invention, a plurality of reflectors 3a are provided so as to surround the area to be monitored, thereby setting a monitoring area 5 monitored by the radar unit. The signal processing unit 2 includes a function to determine whether the suspicious object exists in the monitoring area 5 or out of the monitoring area 5. More specifically, the suspicious object 6a exists in the monitoring area 5 as shown in FIG. 1, and the signal processing unit 2 transmits the alarm activating signal to the alarm means 10. Meanwhile, the suspicious object 6b exists in the detectable area 4 of the radar unit but out of the monitoring area 5. Therefore, the alarm activating signal is not transmitted to the alarm means 10. In this embodiment, not only the detection of the existence of the suspicious object 6a but also the movement of the suspicious object 6a can be monitored and tracked.

Figure 3:
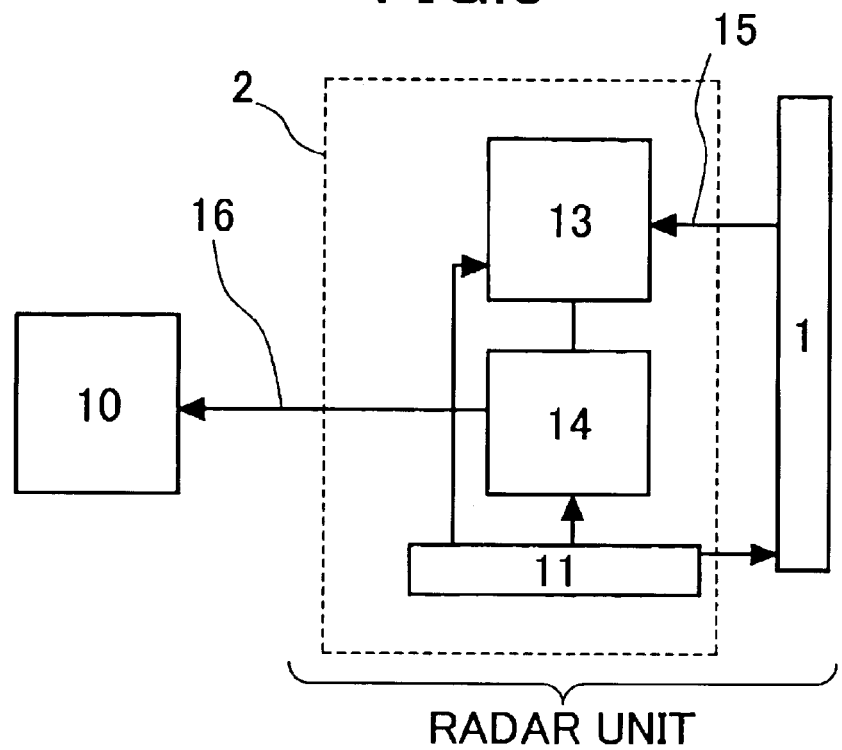
FIG. 3 is a diagram showing a configuration of a radar unit and an alarm device according to an embodiment of the present invention shown in FIG. 1.

FIG. 3 shows a block diagram of the signal processing unit 2 according to the embodiment of the present invention. The reference numeral 1 denotes a radar module for transmitting/receiving microwave signals or millimeterwave signals, and reference numeral 13 denotes an A/D converter. Electric power is supplied to each of the components from a DC power supply unit 11. The intermediate frequency (IF) signal is transmitted from the radar module 1 to the A/D converter 13 and is converted into the digital signal, and the digital signal is transmitted to a signal processor unit (MPU) 14. The IF signal includes the information such as the distance between the detecting object and the radar unit and the relative speed, and thus, the signal processing of the IF signal makes it possible to obtain the coordinate position of the detecting object in the monitoring area 5, the moving direction thereof with the passage of time, and the moving speed thereof. Then, as shown in FIG. 1, when it is determined that a suspicious object exists inside the monitoring area 5 as a result of the comparison between the positions of the reflectors 3a surrounding the monitoring area 5 and the position of the suspicious object (e.g., object 6a), then the alarm activating signal is transmitted to the alarm means 10 via the cable 16.

Figure 7:
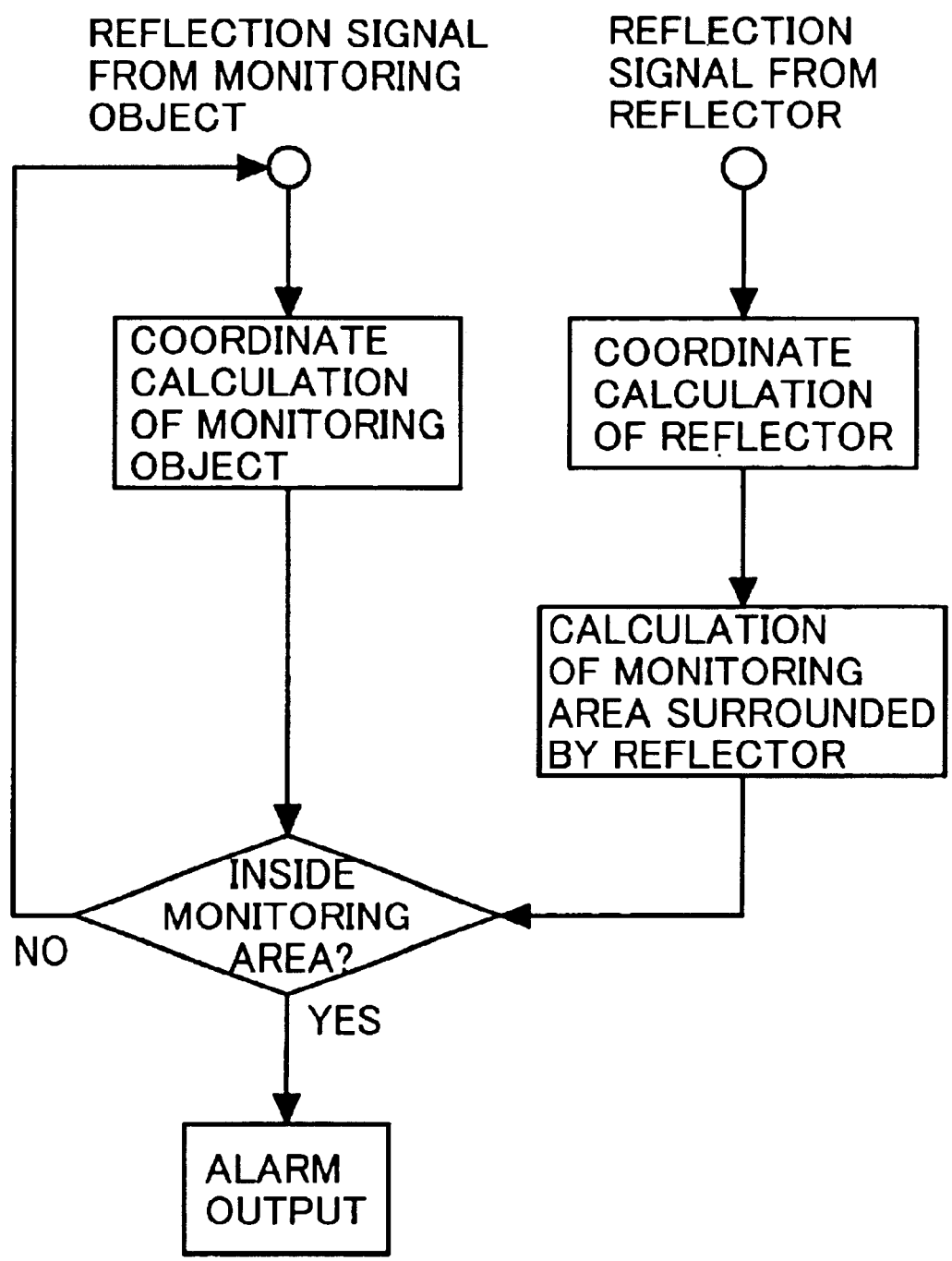
FIG. 7 is a flow chart showing an operational flow in the embodiment of the present invention shown in FIG. 1.

The determination whether the alarm activating signal is transmitted or not is made through, for example, the process shown in FIG. 7. There are two types of signals detected by the radar unit. That is, the signal from the reflector 3a and the signal from the detecting object (suspicious object) to be monitored. The coordinate values of the reflectors are calculated based on the signals from the several reflectors 3a, and the monitoring area surrounded by the reflectors 3a is determined. Also, the coordinate values of the detecting object are calculated based on the signal from the detecting object itself. Then, it is determined whether the coordinate values of the detecting object exist in the monitoring area 5 by comparing these coordinate values. When it is determined that the detecting object is in the monitoring area 5, an alarm is given. When it is not in the monitoring area 5, no alarm is given and the signal from the detecting object is obtained again and the coordinate values thereof are recalculated.

Figure 2:
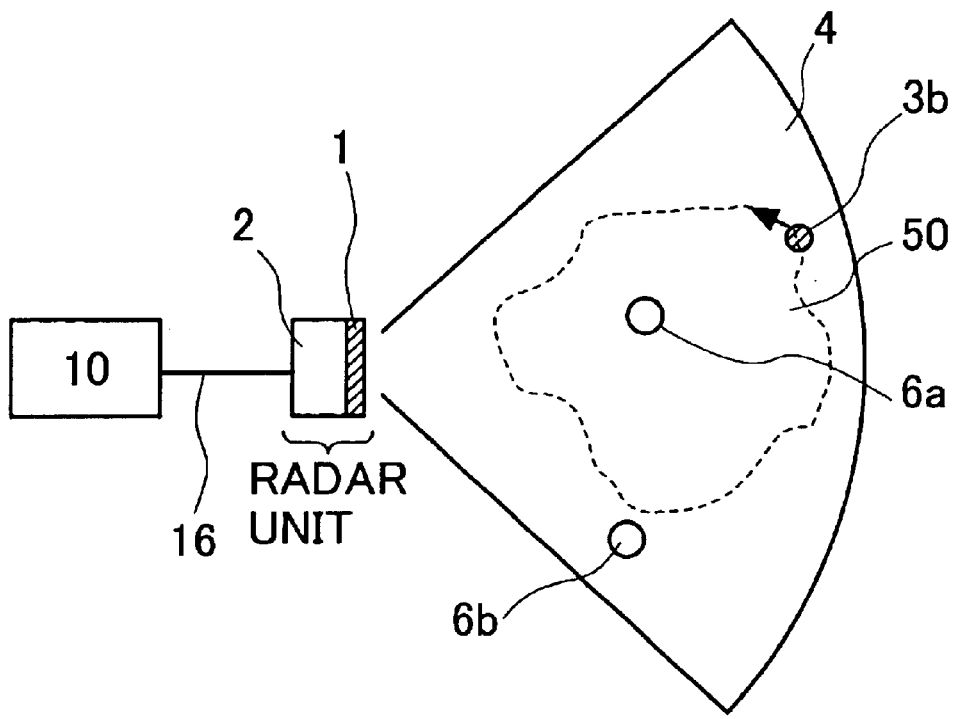
FIG. 2 is a diagram showing another preferred embodiment of the present invention.

Next, another embodiment of the present invention will be described with reference to FIGS. 2, 4, and 8. In this embodiment, the area in which the intrusion of the monitoring object (suspicious object) is to be monitored is set in such a manner as follows. That is, a reflector 3b is moved along the outer periphery of the monitoring area when installing a radar unit, thereby setting a virtual monitoring area 50. For the movement of the reflector 3b, the reflector 3b may be carried by human hands, and the reflector 3b can be moved along the outer periphery by using the moving device attached to the reflector. The signal processing unit 2 includes a function to determine whether the suspicious object exists inside the virtual monitoring area 50 or outside thereof, and in the case where the suspicious object 6a inside the virtual monitoring area 50 is detected, the alarm activating signal is transmitted to the alarm means 10 via the cable 16. Also, in the case of the suspicious object 6b outside the virtual monitoring area 50, the alarm activating signal is not transmitted.

Figure 4:
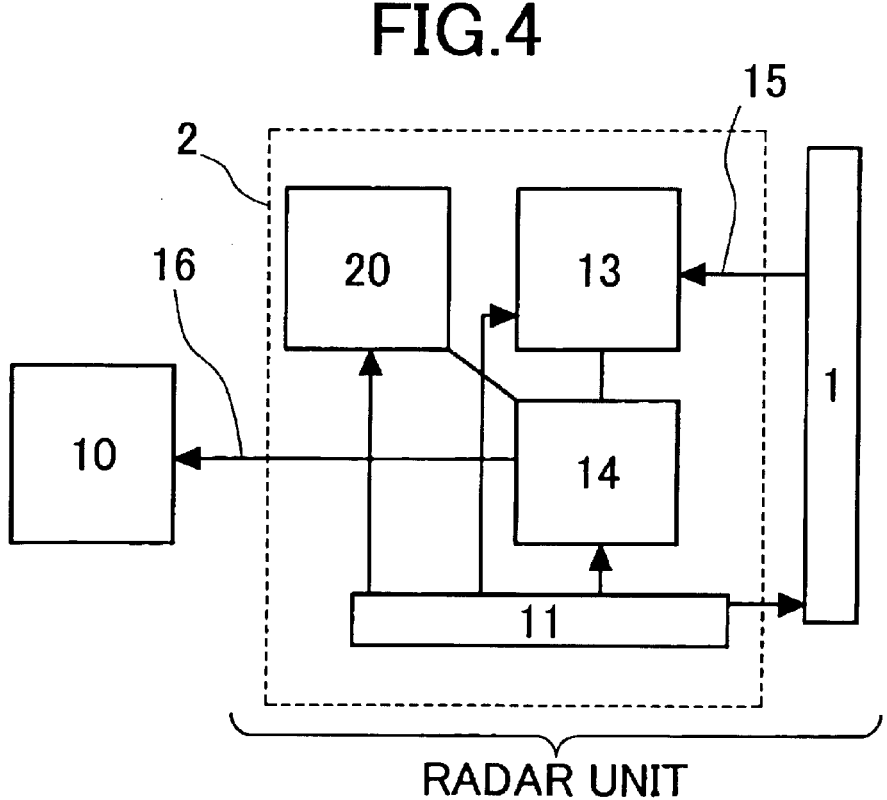
FIG. 4 is a diagram showing a configuration of a radar unit and an alarm device according to an embodiment of the present invention shown in FIG. 2.

The block diagram of the signal processing unit 2 according to the embodiment is shown in FIG. 4. Similar to the configuration in the first embodiment shown in FIG. 3, the radar module 1, the A/D converter 13, and the signal processor unit (MPU) 14 are provided, and a memory means 20 is further provided. The memory means 20 is used when setting the virtual monitoring area 50. More specifically, when setting the virtual monitoring area 50, the reflector 3b is moved along the outer periphery of the monitoring area, and at this time, the coordinate information obtained from the moving reflector 3b is accumulated in the memory means 20. The virtual monitoring area 50 is set based on the coordinate information thus accumulated. When monitoring the movement of the suspicious object by using the radar unit, the obtained coordinates of the suspicious object and the virtual monitoring area 50 stored in the memory means 20 are compared, and the determination is made by the MPU 14 whether the suspicious object exists inside or outside the virtual monitoring area 50.

Figure 8:
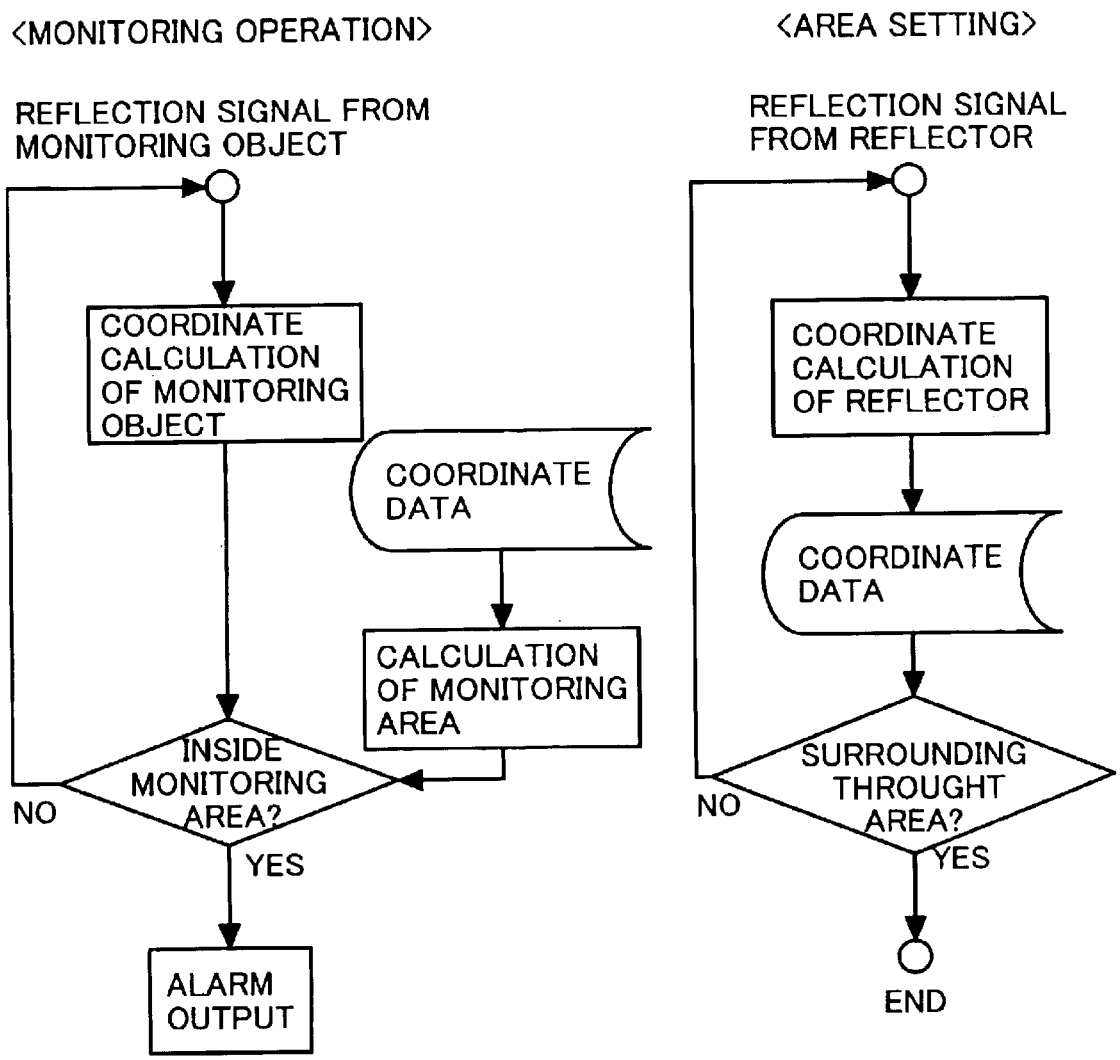
FIG. 8 is a flow chart showing an operational flow in the embodiment of the present invention shown in FIG. 2.

The series of operations are performed according to the flow chart shown in FIG. 8. The operation in this embodiment includes two modes such as a process for setting the virtual monitoring area 50 and an operation for the actual monitoring. In the process for setting the area, the coordinate values of the reflector 3b moving along the outer periphery of the area to be monitored are calculated by using the signals transmitted from the reflector 3b, and the obtained coordinate data is accumulated in the memory means 20. The series of processes are repetitively performed until all of the area to be monitored is surrounded. In the operation for the monitoring, the coordinate values of the detecting object (suspicious object) to be monitored are calculated by using the signals transmitted from the object itself. Then, the coordinate values thus obtained and the coordinate data of the virtual monitoring area 50 accumulated in advance by the memory means 20 are compared with each other, thereby determining whether the coordinate values of the detecting object are inside the virtual monitoring area 50 or not. When the object is inside the monitoring area, an alarm is given. Also, when not inside the monitoring area, no alarm is given and the signal from the detecting object to be monitored is obtained again and the coordinate values thereof are recalculated.

Figure 11A:
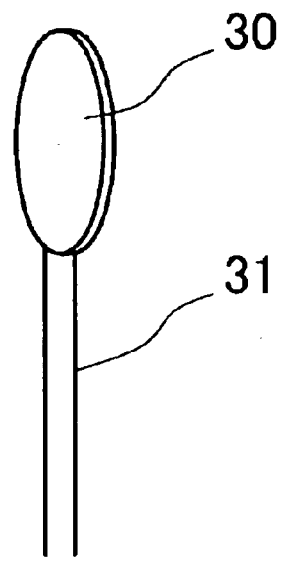
FIGS. 11(a) through 11(c) are drawings illustrating shapes of reflectors used in the present invention.
Figure 11B:
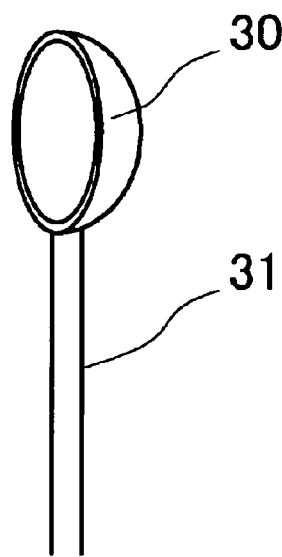
Figure 11C:
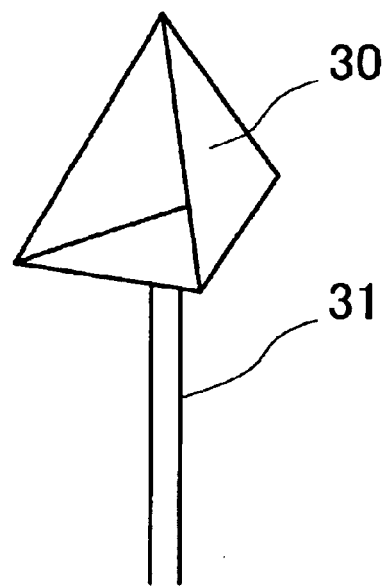

Examples of outer appearances of the reflectors 3a and 3b provided or moved in order to define the monitoring area 5 and the virtual monitoring area 50, are shown in FIGS. 11(a) through 11(c). Each of the reflectors 3a and 3b comprises a reflection plate 30 and a pole 31 of the reflection plate 30. A material capable of reflecting electric waves is used to form the reflection plate 30, for example, the reflection plate 30 is made of metal. In the drawing, three types of the reflection plate 30 are exemplified. In FIG. 11(a), the reflection plate 30 is in the shape of a simple plate, and in FIG. 11(b), the reflection plate 30 is in the shape of a concave mirror so as to intensify the reflected signal. Also, in FIG. 11(c), the reflection plate 30 is in the shape of a polygonal pyramid (Though triangular pyramid is shown as an example, the shape thereof is not limited to this.).

Figure 5:
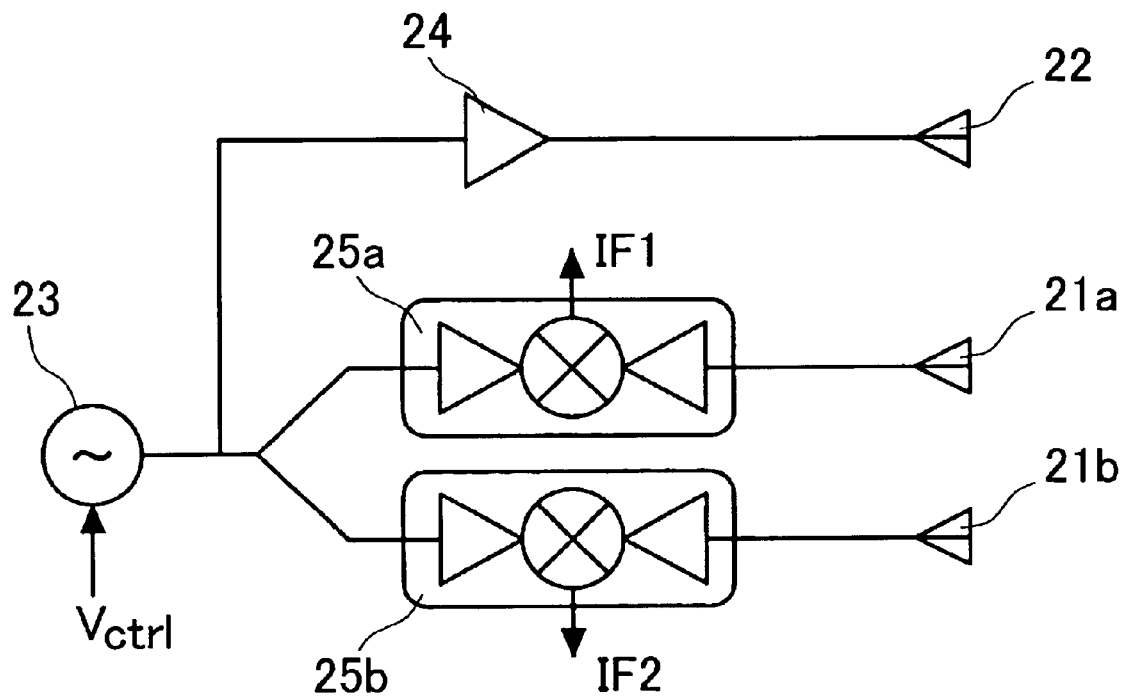
FIG. 5 is a diagram showing a circuit configuration in a radar module of the present invention.
Figure 6:
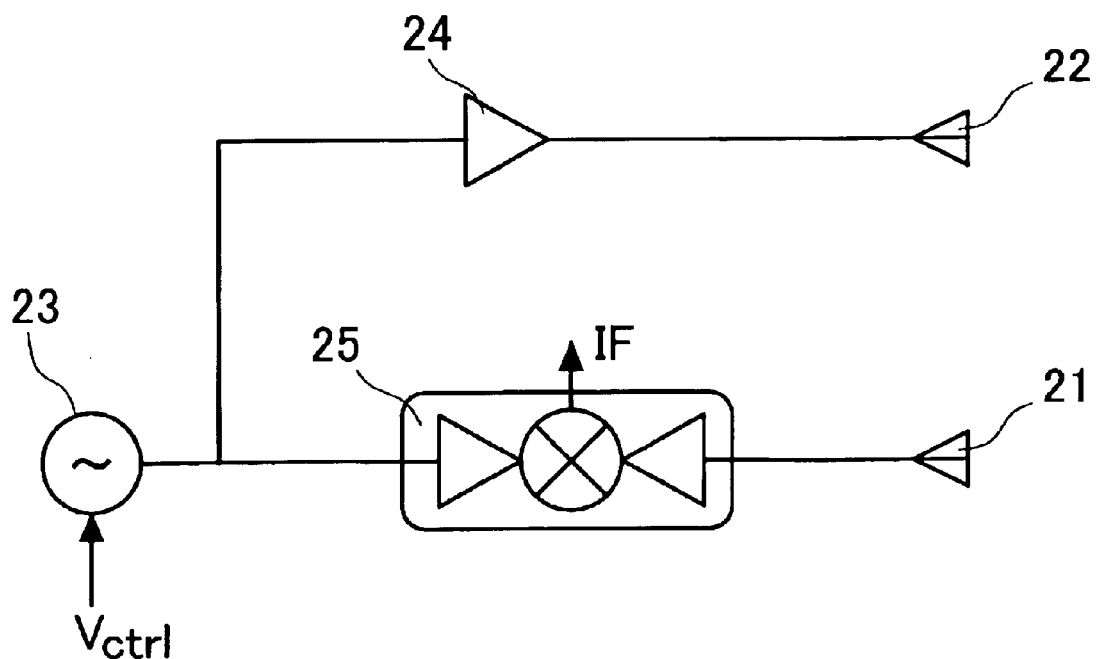
FIG. 6 is a diagram showing another circuit configuration in a radar module of the present invention.

Examples of the circuit configuration included in the radar module 1 of the radar unit used in the present invention are shown in FIGS. 5 and 6.

In the circuit shown in FIG. 5, the radar module 1 comprises a voltage-controlled oscillator (VCO) 23, a power amplifier 24, receivers 25a and 25b, a transmitting antenna 22, and two receiving antennas 21a and 21b. Note that the receiving antennas 21a and 21b are arranged in the horizontal direction. The high frequency signal from the voltage-controlled oscillator 23 is transmitted from the transmitting antenna 22 via the power amplifier 24. Then, the signal reflected at the object is received by the receiving antennas 21a and 21b, and the signal thus received is inputted to the receivers 25a and 26a as an RF signal. The signal from the voltage-controlled oscillator 23 is also inputted to the receivers 25a and 25b as a local signal, and intermediate frequency (IF) signals IF1 and IF2 are generated from the RF signal and the local signal by mixers in the receivers 25a and 25b. Then, the IF signals are transmitted to the A/D converter 13 provided in the signal processing unit 2. The distance to the object and the relative speed are obtained based on the frequency of the IF signals, and the angle to the object in the horizontal direction is obtained based on the phase difference between the two IF signals.

In this embodiment, the case where two receivers are provided is shown. However, the detection accuracy in the horizontal direction can be enhanced by further increasing the number of the receivers.

FIG. 6 shows an example of the circuit in which each one of the receiving antenna 21 and the receiver 25 is provided. The operation of the circuit shown in FIG. 6 is identical to that shown in FIG. 5. However, the circuit requires a device for periodically changing the directions of the transmitting antenna 22 and the receiving antenna 21 so as to detect the angle to the object in the horizontal direction. Both the signal indicating the direction of the antenna and the IF signal are transmitted to the A/D converter 13 provided in the signal processing unit 2, thereby obtaining the distance to the object, the relative speed, and the angle in the horizontal direction.

The oscillation frequency of the voltage-controlled oscillator 23 included in the radar module 1 can be changed by changing the control voltage, and the distance to the object and the relative speed can be obtained by using the function.

Figure 9:
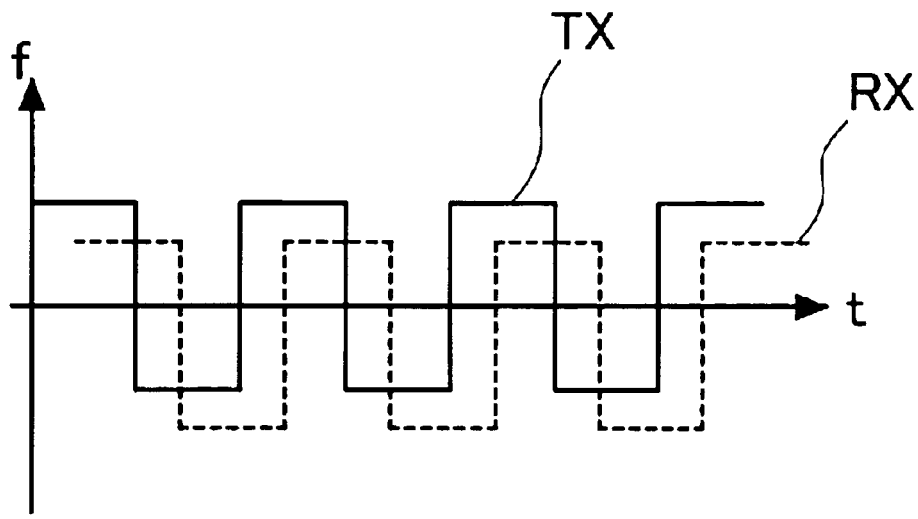
FIG. 9 is a waveform chart showing the state of the transmitting wave and the receiving wave in the dual frequency CW method.
Figure 10:
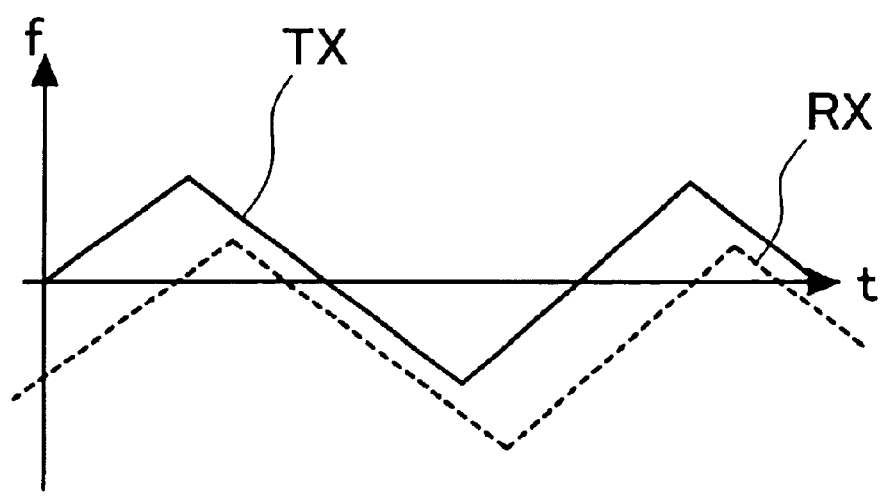
FIG. 10 is a waveform chart showing the state of the transmitting wave and the receiving wave in the FMCW method.

An example of a sweeping method of a frequency applicable to the present invention is shown in FIGS. 9 and 10. In both of FIGS. 9 and 10, the horizontal axis of the graph represents time, and the vertical axis thereof represents frequency. FIG. 9 shows the dual frequency CW (Continuous Wave) method, in which two frequency signals are regularly switched. The transmitting signal TX and the receiving signal RX are in a state as shown in FIG. 9, and the distance to the object can be determined from the time difference between TX and RX (difference in the lateral direction of the graph), and the relative speed of the object can be determined from the frequency difference (difference in the longitudinal direction of the graph). FIG. 10 shows the Frequency Modulated Continuous Wave (FMCW) method, in which the interval between the two frequencies is continuously changed. Similar to the above-described dual frequency CW method, also in the FMCW method, the distance to the object can be determined from the time difference between TX and RX, and the relative speed of the object can be determined from the frequency difference.

Note that in such a case where the relative speed of the object is 0 (in a stationary state), the dual-frequency CW method cannot detect the object because the intermediate frequency (IF) generated by the receiver comes to 0 hertz. Meanwhile, even in such a case where the relative speed of the object is 0, the FMCW method can detect the object because the intermediate frequency does not come to 0 hertz.

In addition, the calibration of the radar unit and the self diagnosis thereof can be performed by using at least one of the reflectors 3a and 3b used in the embodiment of the present invention.

For example, the operation program is set so as to calculate the coordinate value of the reflectors 3a and 3b by use of the signals from the reflectors 3a and 3b at a constant interval, and then an adjustment means functioning to compare the calculated coordinate values and the actual positions of the reflectors 3a and 3b and to make an adjustment to eliminate the difference therebetween is provided. By doing so, the detection accuracy of the radar unit can be maintained in an optimal state.

Also, if the self-diagnosis means is provided, when the signals from the reflectors are not detected or the signal intensity is extremely reduced, it is possible to determine that there is something wrong with the function of the radar unit and also to give an alarm to the user. Note that the calibration means and the self-diagnosis means of the radar unit can be operated automatically or can be operated at any suitable time depending on the intention of the user.

The advantages obtained by the present invention are as follows.

First, in the detecting system using a radar, since the detection and monitoring of an intruder can be performed while a transmitting antenna and a receiving antenna are provided in a common case box, the flexibility in installing the detecting system can be improved.

Second, since surface information of an intruding object can be obtained in the detecting system using a radar, the possibility of the error detection is extremely reduced and the performance thereof can be enhanced.

Third, since there is little impact on the propagating property of the electric wave even under bad weather conditions such as fog and snow in the detecting system using a radar, the reliability thereof can be enhanced.

Fourth, since the detecting area of the radar can be set, the error detection that an alarm is given in response to the detected object outside the area where the existence of a suspicious object is monitored can be prevented.

Fifth, since the calibration and self diagnosis of the radar unit can be performed by use of the reflectors, the reliability of the detecting system can be obtained.

INDUSTRIAL APPLICABILITY

The present invention relates to a detecting system using a microwave radar or a millimeter radar, which is suitably used as a security monitoring system to detect the existence of a suspicious person and to give an alarm when there exists a suspicious person.

What is claimed is:

1. A detecting system comprising:
    a radar for detecting an object within a detecting area by detecting at least an angle to the object in a horizontal direction, the angle being obtained based on a phase difference between two signals from the object;
    a notification device for notifying the detection of the object;
    a signal processing unit for controlling the notification device based on a detection signal sent from the radar; and
    a detecting area setting device for setting a range of the detecting area.

2. A detecting system comprising:
    a radar for detecting an object within a detecting area;
    a notification device for notifying the detection of the object;
    a signal processing unit for controlling the notification device based on a detection signal sent from the radar; and
    a detecting area setting device for setting a range of the detecting area,
    wherein the radar is one of a millimeterwave radar and a microwave radar having a transmitting antenna for transmitting a corresponding one of a millimeterwave signal and a microwave signal, and a receiving antenna for receiving the corresponding one of the millimeterwave signal and the microwave signal reflected from the object.

3. The detecting system according to claim 2, wherein the signal processing unit is configured to obtain coordinates of the object and track movement of the object within the detecting area.

4. The detecting system according to claim 3, wherein:
    the detecting area setting device is provided with a plurality of reflectors which are set on an outer periphery of the detecting area;
    the detecting area is set by use of reflected signals from the reflectors; and
    the notification device is set up to operate when the object is inside the detecting area.

5. The detecting system according to claim 4, wherein the radar is provided with calibration means to perform calibration of the radar.

6. The detecting system according to claim 5, wherein the calibration means performs an adjustment so as to reduce the difference between a distance to the reflector calculated based on a reflected signal from at least one of the reflectors and an actual distance to the reflector, thereby performing calibration of the radar.

7. The detecting system according to claim 5, further comprising self-diagnosis means arranged to notify abnormality of the radar, when intensity of the reflected signal from the reflector is reduced.

8. The detecting system according to claim 3, wherein:
    the signal processing unit has a memory;
    the detecting area setting device has a reflector;
    the detecting area is set by storing information signals obtained by moving the reflector along an outer periphery of the detecting area in the memory; and
    the notification device is set up to operate when the object is inside the detecting area.

9. A detecting system comprising:
    a millimeterwave or microwave radar for detecting and monitoring an object by detecting and monitoring at least an angle to the object in a horizontal direction, the angle being obtained based on a phase difference between two signals from the object;
    an alarm device for notifying detection of the object;
    a signal processing unit for processing a detection signal received by the radar and sending an operating signal to the alarm device; and
    a monitoring area setting device for setting a monitoring area of the object,
    wherein the signal processing unit controls the alarm device so as to generate an alarm when the object exists inside the monitoring area and so as not to generate an alarm when the object is outside the monitoring area.

10. A detecting system comprising:
    a millimeterwave or microwave radar for detecting and monitoring an object;
    an alarm device for notifying detection of the object;
    a signal processing unit for processing a detection signal received by the radar and sending an operating signal to the alarm device; and
    a monitoring area setting device for setting a monitoring area of the object,
    wherein the signal processing unit controls the alarm device so as to generate an alarm when the object exists inside the monitoring area and so as not to generate an alarm when the object is outside the monitoring area, and
    wherein the signal processing unit is configured to monitor movement of the object relative to the monitoring area.

11. The detecting system according to claim 10, wherein the monitoring area setting device has a reflector, and the monitoring area is set by use of a reflected signal from the reflector.

12. The detecting system according to claim 11, wherein the radar is provided with calibration means to perform an adjustment so as to reduce the difference between a distance to the reflector calculated based on a reflected signal from the reflector and an actual distance to the reflector, thereby performing calibration of the radar.

13. The detecting system according to claim 11, wherein the radar is provided with self-diagnosis means to notify abnormality of the radar, when intensity of the reflected signal from the reflector is reduced.

14. The detecting system according to claim 11, wherein the radar has two or more receiving antennas arranged in a horizontal direction and two or more receivers connected to the receiving antennas; and wherein an angle to the object in the horizontal direction can be obtained based on the phase difference between reflected signals from the object received by the two or more receiving antennas.

15. The detecting system according to claim 11, wherein the radar has a transmitting antenna, a receiving antenna, a receiver connected to the receiving antenna, and means for periodically changing directions of the receiving antenna and the transmitting antenna.

16. The detecting system according to claim 11, wherein the radar detects a distance to the object and a relative speed by using a frequency modulated continuous wave (FMCW) method.

17. The detecting system according to claim 11, wherein the reflector is made of metal.

18. The detecting system according to claim 10, wherein:
the monitoring area setting device is provided with a plurality of reflectors set on an outer periphery of the monitoring area; and
the monitoring area is set by use of reflected signals from the reflectors.

19. The detecting system according to claim 10, wherein:
the signal processing unit has a memory;
the monitoring area setting device has a reflector; and
the monitoring area is set by accumulating information signals obtained by moving the reflector along an outer periphery of the monitoring area.

20. A security system comprising:
a radar including a transmitting antenna to transmit a radar signal within an operating area, and one or more receiving antennas to receive one or more reflected signals within the operating area;
a signal processing unit connected to the radar module, to detect an object within the operating area, to monitor the object as the object moves into a designated monitoring area within the operating area, and to generate an alarm activating signal when the object is in the designated monitoring area; and
an alarm device arranged to generate a security alarm upon receipt of the alarm activating signal,
wherein the designated monitoring area is set by moving a reflector along an outer periphery of the designated monitoring area within the operating area of the radar, so that the signal processing unit monitors movement of the object relative to the designated monitoring area by processing the reflected signals received from the object as the object moves into the designated monitoring area within the operating area of the radar relative to information set, when the reflector moves along the outer periphery of the designated monitoring area.

21. The security system according to claim 20, wherein the operating area of the radar is a fan-shaped area principally determined by a maximum detecting distance and a maximum detecting angle which depend on the performance of the transmitting antenna.

22. The security system according to claim 20, wherein, alternatively, the designated monitoring area is set by a plurality of reflectors arranged at respective corners to surround the designated monitoring area within the operating area of the radar so that the signal processing unit can monitor movement of the object relative to the designated monitoring area by processing the reflected signals received from the reflectors and the object as the object moves into the designated monitoring area within the operating area of the radar.

23. The security system according to claim 20, wherein the radar is one of a millimeterwave radar and a microwave radar having a transmitting antenna for transmitting a corresponding one of a millimeterwave signal and a microwave signal, and at least one receiving antenna for receiving the corresponding one of the millimeterwave signal and the microwave signal, as the reflected signals, reflected from the object.

24. A security system comprising:
a radar including a transmitting antenna to transmit a radar signal within an operating area, and one or more receiving antennas to receive one or more reflected signals within the operating area;
a signal processing unit connected to the radar module, to detect an object within the operating area, to monitor the object as the object moves into a designated monitoring area within the operating area, and to generate an alarm activating signal when the object is in the designated monitoring area; and
an alarm device arranged to generate a security alarm upon receipt of the alarm activating signal,
wherein the operating area of the radar is a fan-shaped area principally determined by a maximum detecting distance and a maximum detecting angle which depend on the performance of the transmitting antenna, and
wherein the radar is provided with calibration means to perform an adjustment so as to reduce the difference between a distance to reflectors set on an outer periphery of the designated monitoring area within the operating area of the radar, calculated based on reflected signals from the reflectors and an actual distance to the reflectors, thereby performing calibration of the radar.

25. A security system comprising:
a radar including a transmitting antenna to transmit a radar signal within an operating area, and one or more receiving antennas to receive one or more reflected signals within the operating area;
a signal processing unit connected to the radar module, to detect an object within the operating area, to monitor the object as the object moves into a designated monitoring area within the operating area, and to generate an alarm activating signal when the object is in the designated monitoring area; and
an alarm device arranged to generate a security alarm upon receipt of the alarm activating signal,
wherein the operating area of the radar is a fan-shaped area principally determined by a maximum detecting distance and a maximum detecting angle which depend on the performance of the transmitting antenna, and
wherein the radar is provided with self-diagnosis means to notify abnormality of the radar, when an intensity of the reflected signals from reflectors set on an outer periphery of the designated monitoring area within the operating area of the radar, is reduced.

26. A security system comprising:
a radar including a transmitting antenna to transmit a radar signal within an operating area, and one or more receiving antennas to receive one or more reflected signals within the operating area;
a signal processing unit connected to the radar module, to detect an object within the operating area, to monitor the object as the object moves into a designated monitoring area within the operating area, and to generate an alarm activating signal when the object is in the designated monitoring area; and an alarm device arranged to generate a security alarm upon receipt of the alarm activating signal, wherein the operating area of the radar is a fan-shaped area principally determined by a maximum detecting distance and a maximum detecting angle which depend on the performance of the transmitting antenna, and wherein the radar detects a distance to the object and a relative speed of the object as the object moves into the designated monitoring area by using a frequency modulated continuous wave (FMCW) method.

* * * * *